Nov. 17, 1970   W. R. WRIGHT ET AL   3,540,975
IRON-ON TRIMS AND FINDINGS
Filed Aug. 17, 1967   2 Sheets-Sheet 2

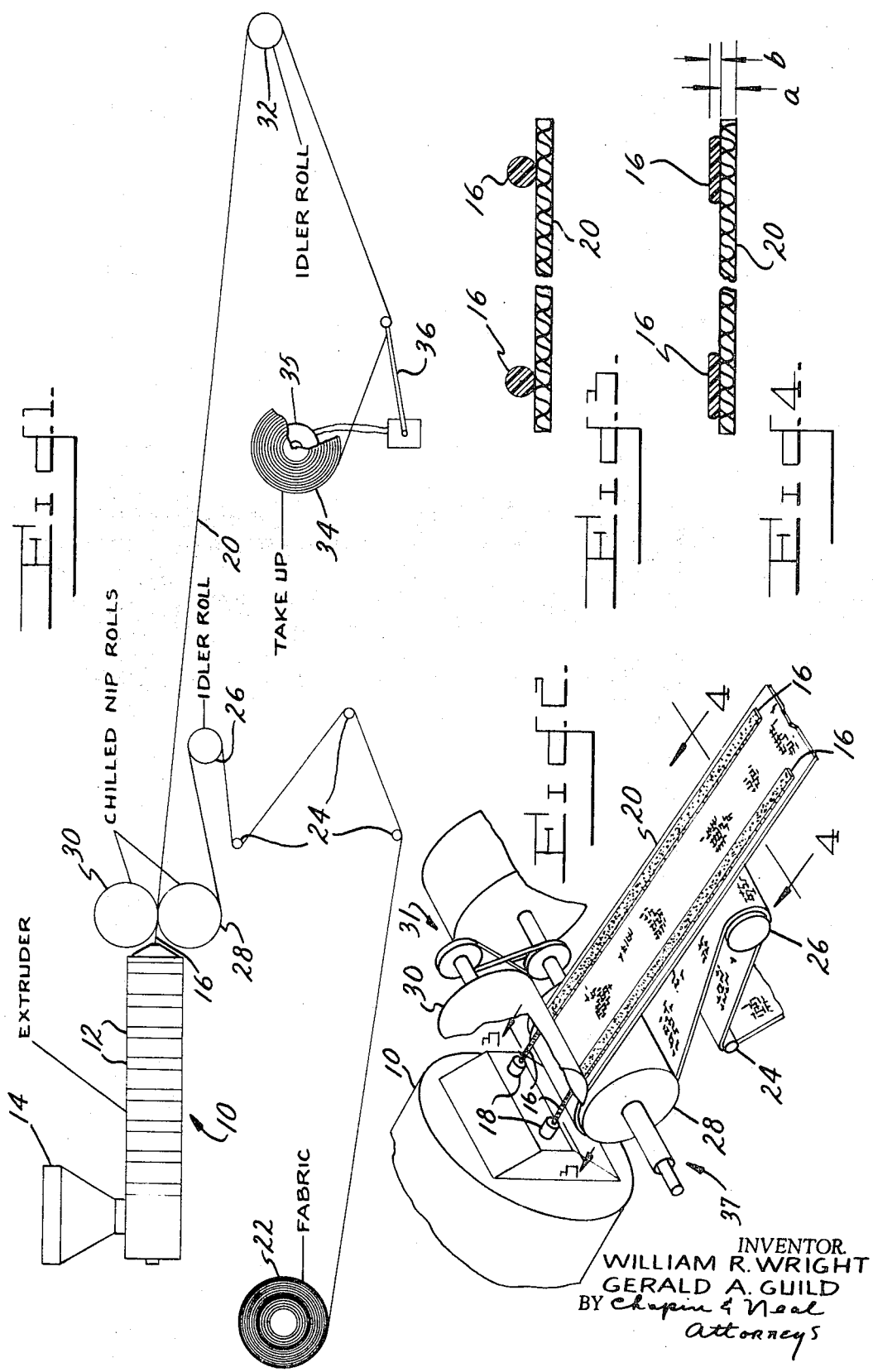

INVENTORS
WILLIAM R. WRIGHT
GERALD A. GUILD
BY Chapin & Neal
Attorneys

United States Patent Office 3,540,975
Patented Nov. 17, 1970

3,540,975
IRON-ON TRIMS AND FINDINGS
William R. Wright, Warren, and Gerald A. Guild, Brimfield, Mass., assignors to Wm. E. Wright Co., West Warren, Mass., a corporation of Delaware
Continuation-in-part of application Ser. No. 549,756, Apr. 21, 1966, which is a continuation-in-part of application Ser. No. 472,261, July 15, 1965. This application Aug. 17, 1967, Ser. No. 663,924
Int. Cl. B32b 7/14; C09j 7/04
U.S. Cl. 161—86                   1 Claim

ABSTRACT OF THE DISCLOSURE

Iron-on trims and findings are produced by extruding at least two filaments of a hot-melt thermoplastic resin adhesive onto a textile fabric, and flattening and cooling the filaments to form bands adhered to the surface of the fabric. The adhesive is characterized in that it has a relatively low softening temperature of from about 200° F. to 280° F. and a plastic range of from about 220° F. to a point in excess of 500° F.

The relationship of thickness between the fabric and the adhesive bands is such that the adhesive shows through the fabric when heat and pressure are applied to the side of the fabric opposite the adhesive providing a visual indicator in the form of lines showing when a permanent bond has been achieved.

---

This application is a continuation-in-part of our earlier filed applications Serial No. 472,261, filed July 15, 1965, now abandoned, and Serial No. 549,756, filed Apr. 21, 1966 now abandoned, which is a continuation-in-part of application Serial No. 472,261.

BACKGROUND

This invention relates to trims and findings for textile articles and to methods for making trims and findings permanently bondable by the use of a heat responsive binder or adhesive.

In the textile field, the use of heat responsive adhesives is well known for such uses as applying emblems, decorations, knee patches and the like. The adhesives heretofore available are generally solvent type with alkyd based resins, and have many serious limitations including:

(1) High activating temperatures are required (375° F. to 425° F.), thus at least "cotton setting" is called for on household flat irons. The adhesives are therefore unsuitable for use on fabrics of thermoplastic fiber, such as nylon, rayon, Dacron and the like.

(2) Low bond strength (of the order of two to four pounds per inch). This level of adhesion is only marginally adequate when considering an all over coating of patch fabric, but it is far from sufficient when applied in a narrow band such as to replace a line of stitching.

(3) Starting at a marginal level, adhesive bond deteriorates with repeated washing or dry cleaning.

(4) The solvent based adhesives are too readily absorbed by the fabrics which must be "sized" to prevent penetration or "strike through" of the adhesive through the fabric.

(5) With repeated washing or dry cleaning, the adhesives become stiff and brittle with resulting bond failure. Even though plasticizers are generally added to keep the adhesive flexible, these are lost with repeated washing and/or dry cleaning.

(6) There is no way for the user to determine whether or not a permanent bond has been achieved.

Conventionally, "iron-on" products are manufactured by a coating process in which a heat responsive adhesive is applied to a fabric in a suitable solvent vehicle. The Cala Patent No. 3,168,749 discloses, for example "iron-on" hem tapes coated with thermo-responsive adhesives. This patent refers to conventional industrial coating techniques for applying adhesive backing to fabric tapes and gives as examples of suitable adhesives those sold under the trade name "Bostik," which are well known as solvent based adhesives applied to substrates in an organic solvent system.

Despite their evident advantage in ease of application as opposed to sewing, "iron-on" products have not generally been extended to use in garments, trimming, furnishing and construction.

It is the principal object of this invention to provide "iron-on" trims and findings which once applied remain permanently in place unless intentionally removed, despite numerous wet and dry cleaning operations.

It is another object of this invention to provide improved methods for the fabrication of "iron-on" trims and findings of the above type.

Other objects and advantages of this invention will be more readily apparent from the following description of the accompanying drawings, in which:

FIG. 1 is a diagrammatical view illustrative of a process embodying this invention;

FIG. 2 is a perspective view showing in greater detail a portion of the FIG. 1 process;

FIG. 3 is a section on a greatly enlarged scale taken along line 3—3 of FIG. 2;

FIG. 4 is a section on a greatly enlarged scale taken along line 4—4 of FIG. 2;

Figure 5:
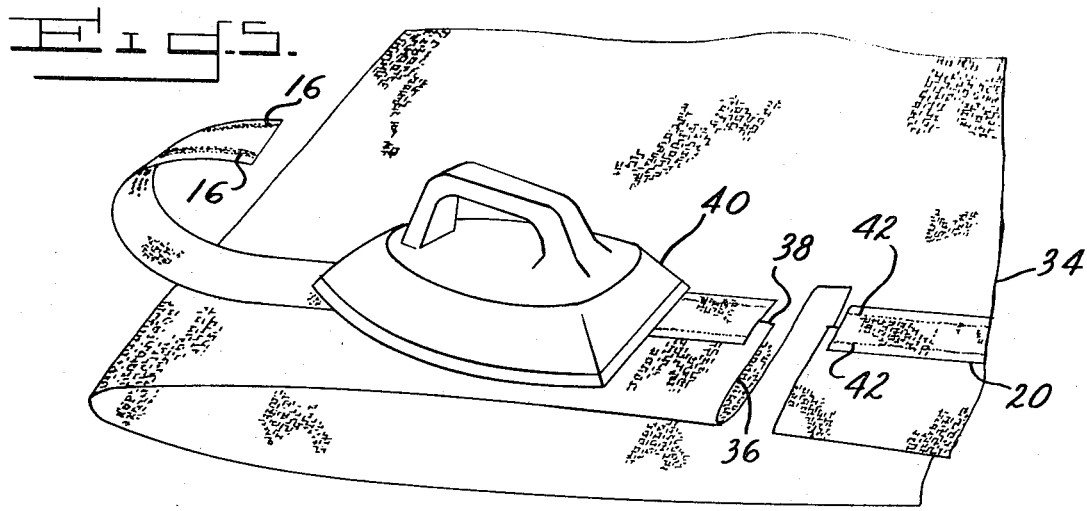
FIG. 5 is a perspective view showing the application of a seam binding embodying the invention.
Figure 6:
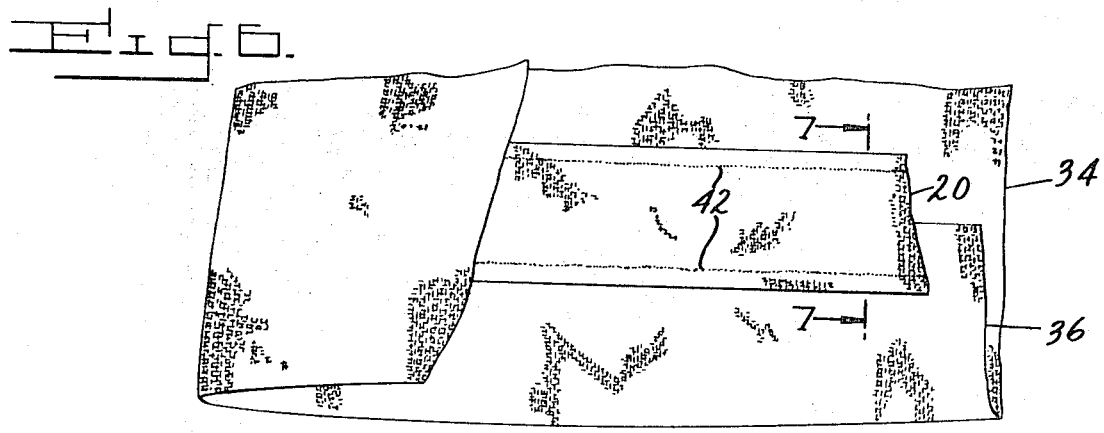
FIG. 6 is a partial view similar to FIG. 5 showing the binding in place.

Referring in detail to the drawings, in FIG. 1 is shown method and apparatus suitable for use in carrying out this invention. The apparatus comprises an extruder 10 which may be a screw type extruder heated by any suitable means, such as electrical band heaters 12. Thermoplastic resin may be fed into the barrel of the extruder by means of a hopper 14. The extruder is operated under the proper temperature and pressure conditions, depending upon the thermoplastic resin being supplied thereto, to extrude one or more beads or filaments of resin 16 from the die 18, as shown in FIG. 2. The resin, preferably a polyester type, is extruded in a soft and tacky or plastic state but nevertheless form stable condition directly onto a fabric web 20. The fabric web 20 is unwound from a roll of fabric 22, taken about guide rolls 24, then about an idler roll 26 to a position between chilled nip rolls 28 and 30. From the nip rolls 28 and 30, which are driven by conventional drive means, such as an electric motor and pulley arrangement shown at 31, the fabric is taken about another idler roll 32 and rewound on a take-up roll 34, driven by electric motor 35. In order to insure uniform tension of the fabric web 20, a tension control bar 36 is provided. This type of control unit detects changes in web tension and transmits a speed adjustment signal to the drive motor 35 of the take-up roll, whereby the web tension is automatically and continuously maintained at a desired level.

Referring to FIG. 1, it will be seen that the extruded filaments of resin 16 are extruded onto the fabric 20 almost directly into the bite of the nip rolls 28 and 30. Preferably both nip rolls 28 and 30 are cooled by suitable means, such as by circulating water through a concentric shaft, as shown at 37. With this arrangement the resin extrudate is immediately set by cooling and substantially simultaneously flattened and pressed against the web 20, whereby the extruded bead is changed from a generally soft round circular cross-section, shown in FIG. 3, to a generally flat band or tape of adhesive, as shown in FIG. 4.

Since the soft, tacky adhesive 16 is extruded onto the fabric web as it passes into the bite of the cooling nip roll, it has been found important that the roll be surfaced or coated with an adhesive material, such as polytetrafluoroethylene. Moreover, it is preferable to so coat both rolls to permit removal of misapplied adhesive from their surfaces during operation.

It will be observed in FIGS. 3 and 4 that the resin extrusion does not penetrate into or through the fabric. The reason for this is that the resin although heated to above its flow point when it is extruded from the die 18, is sufficiently viscous so that the filament is form stable and does not penetrate the fabric to any substantial degree. In addition, the thermoplastic resin adhesive is sufficiently tacky so as to adhere firmly to the surface of the fabric web to which it is applied.

Not only does the resin play an important role in the permanence of the resin-fabric bond, but also careful consideration must be given to the fabric treatment. As is well known, fabrics for use in trimming or furnishing textile articles are treated with a composition to obtain properties of color fastness, shrinkage control and crease resistance. A composition widely used for this purpose is a bifunctional ethylene-urea derivative with a suitable catalyst and a softener to impart a soft hand to the fabric.

It has been found that many softeners are not compatible with polyester type resins and have a deleterious effect on the adhesive bond obtained between the fabric and resin bead 16.

In accordance with this invention, however, it has been discovered that fabrics treated with an ethylene-urea, metal catalyst, such as $MgCl_2$ and a polyethylene emulsion produce iron-on textile products not only of soft and smooth hand, but also possessed of outstanding adhesive properties between the "iron-on" bonding resin and the fabric layer.

The fabric 20 can be any desirable configuration for use in making, trimming or furnishing textile garments and articles, such as curtains, household decorations, tablecloths, furniture coverings or the like. For example, in the embodiment shown, the fabric 20 may be a seam binding or tape, usually on the order of .005 of an inch in thickness, and having a width in the range of approximately ⅜–2½ inches. The filaments of adhesive 16 may be on the order of .020–.035" in diameter and are disposed in mutually parallel relation and spaced inwardly on the side edges of the fabric tape 20. When flattened they form beads or bands on the order of .003"–.008" in thickness and .070"–.100" in width. The continuous flat resinous bands are thus adhered to the fabric web along what would generally be considered the sew line of a seam binding. When applied to a garment by using a heated flat iron, there thus is no danger of the heated thermoplastic resin flowing out from tape edges and sticking to the iron.

Of known thermoplastic resins which could be used in practicing this invention, it has been found preferable to use polyester type resins.

As a practical matter, the polyester resin selected must have a relatively low softening temperature of from about 200° F. to 280° F. This temperature range is important for the resin must be capable of softening under the use of a standard electric iron, which usually operates between 220° F. and 500° F., and yet be capable of withstanding temperatures, approximately 160° F. to 180° F., normally encountered in automatic driers and automatic washing machines.

While the polyester resin used must have a relatively low softening point as described above, it also has a wide plastic range. By this it is meant that the resin has a temperature range over which it will not flow or become fluid in the manner of ordinary hot melt adhesives. A plastic range, from approximately 220 F., to a point in excess of 500° F., has been found most suitable. When heated in this plastic range the polyester resins used in carrying out this invention become tacky but yet remain in an essentially plastic or gel state. Thus while they will adhere to the surface of a fabric, they will not flow or penetrate into and through the fabric.

In the plastic range, polyester type resins become less viscous as the temperature increases and in particular, when heated to different points within the plastic range the change in viscosity is quite noticeable. This viscosity characteristic is most advantageous because when the resin is in the upper portion of its plastic range, such as under the heat of an electric iron, the viscosity is sufficiently low to permit the resin to be pressed into the interstices of textile fabrics. Nevertheless, the resin does not become fluid so as to be absorbed or "wicked" into the fabric fibers. In this way when subsequently cooled, the resin hardens to encapsulate the fibers, and where used between two fabrics a strong bond is formed at least equal in strength to that of the encapsulated fibers.

The wide temperature range between the softening and flow points also means that the resin can be readily softened and applied in the tacky state without danger of the resin melting and penetrating the fabric. This particular characteristic of polyester resin adhesives is important, since other hot melt adhesives were found generally to have much too sharp a melt point to enable them to be used for "iron-on" trims and findings. During activation with a flat iron, these hot melt adhesives tended to be quickly absorbed by the fabrics causing insufficient adhesive at the interface to achieve a bond.

In general, the polyester resin used in this invention should be a relatively high molecular weight material, such that its melting point is in the range of about 248° F. to about 266° F. and its viscosity by falling ball at 419° F. is from about 75 to 95 seconds. It has been found, that such a material when extruded onto a seam binding is of sufficiently high viscosity so that it is form stable as it is applied to the fabric. Thus the resin while sufficiently tacky firmly adheres to the fabric but does not penetrate or strike through the fabric.

It appears that an ideal polyester resin should be an amorphous, rubbery extensible material and excellent results have been obtained using a terpolyester resin formed from the polymerization of a diol with the condensation product of isophthalic acid, terephthalic acid and a aliphatic dicarboxylic acid, such as one having 6 to 10 carbon atoms in its molecular structure.

Suitable results may be obtained where the above noted acids, used to produce the resin polymer employed in this invention, are based on polymer weight, in the following percentages: isophthalic acid 20–25%, terephthalic acid 30–35% and aliphatic dicarboxylic acid 1–5%.

In regard to the bonding and cleaning characteristics, tests were conducted to determine the effects of dry cleaning solvents and conditions on tensile shear strength of fabric/fabric bonds made with the product of this invention.

In the tensile shear strength testing which follows ½" x 5" rayon fabric strips, treated with the urea-polyethylene emulsion described above, with two approximately 0.075" wide x 0.007" thick bands of an adhesive as described above were laminated to 1.5" x 5" cotton strips in a fashion which produced a three inch end-to-end overlap. The two strips were laminated together by placing them between steel blocks weighing approximately 5 pounds, for 10 seconds in a 350° F. oven. The laminates were allowed to age over 16 hours at room temperature.

Testing employing the above described laminates was conducted as follows:

(a) Five untreated (dry) tensile shear laminates were stressed at a rate of 12 inches/minute in an Instron Tensile Tester and the type of failure was noted, i.e., rayon, adhesive, cotton, or the bonds between them, for control data. The results are tabulated below.

(b) Five laminates soaked 20 minutes in 90° F. perchloroethylene solvent and five laminates soaked 20 minutes in 90° F. Stoddard's Solvent were pulled apart immediately after soaking (approximately 30 seconds). The results are tabulated below.

(c) Five laminates soaked 20 minutes in 90° F. perchloroethylene solvent and five laminates soaked 20 minutes in 90° F. Stoddard's Solvent were immediately pulled apart after soaking (approximately 30 seconds) by the Instron apparatus equipped with an oven surrounding the jaws to maintain a temperature of 160±4° F. The results are tabulated below.

(d) Same procedure as in (c) above, only the laminates were left to dry in the oven at 160° F. for 10 minutes before being pulled apart. The results are tabulated below.

(e) Same procedure as in (d) above, only the laminates were left to dry in the oven at 160° F. for 20 minutes before being pulled apart. The results are tabulated below.

(f) Same procedure as in (d) above, only the laminates were left to dry in the oven at 160° F. for 40 minutes before being pulled apart. The results are tabulated below.

Results:

| Conditions | Solvent | Tensile shear strengths | |
|---|---|---|---|
| | | Average (lbs.) | Type of failure |
| 73° F.—dry | None | 13.2 | Fabric. |
| 90° F.—wet | Perchloroethylene | 15.5 | Fabric. |
| | Stoddard's solvent | 16.2 | Cloth. |
| 160° F.—drying 30 sec | Perchloroethylene | 10.1 | (1) |
| | Stoddard's solvent | 16.7 | Fabric. |
| 160° F.—drying 10 min | Perchloroethylene | 15.2 | Fabric. |
| | Stoddard's solvent | 15.7 | Cloth. |
| 160° F.—drying 20 min | Perchloroethylene | 14.5 | Cloth. |
| | Stoddard's solvent | 14.3 | Fabric. |
| 160° F.—drying 40 min | Perchloroethylene | 12.5 | Fabric. |
| | Stoddard's solvent | 12.7 | Cloth. |

[1] Rayon and rayon-adhesive.

It will be noted from the above that the adhesive itself failed in only one instance and that generally the solvent treated test strips tested at values higher than the untreated control strips. Insofar as is known, no presently available "iron-on" products are able to withstand the harsh action of dry cleaning solvents, particularly when heated as in commercial pressing or drying operations. From this it is concluded that dry cleaning materials, temperatures and conditions have little or no effect on the tensile shear strength and the bond "life" of products embodying this invention.

Figures 7, 8:
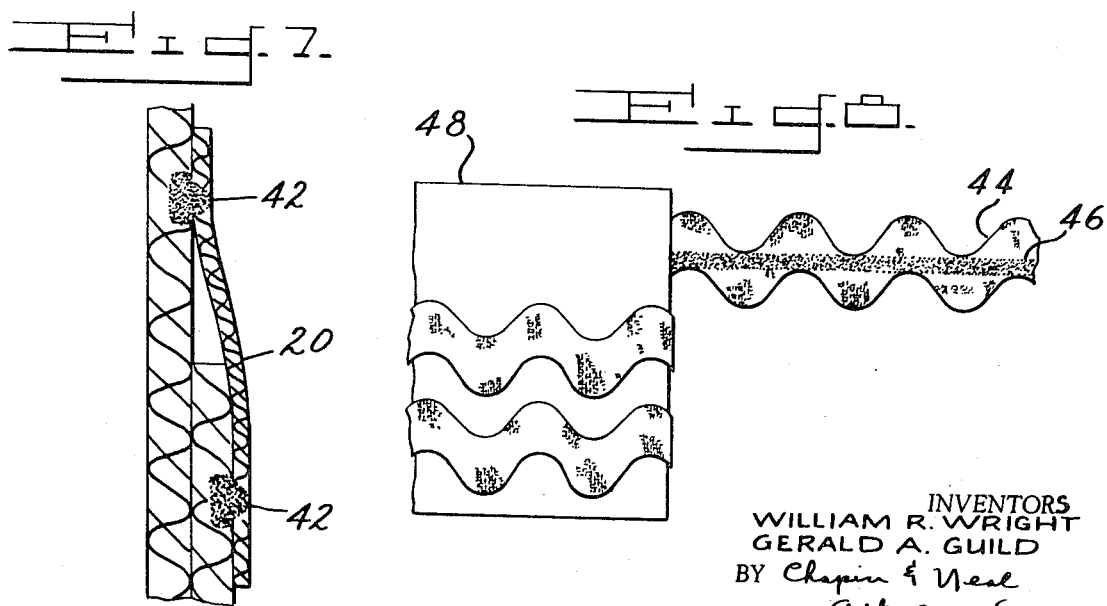
FIG. 7 is a section taken along line 7—7 of FIG. 6 on a greatly enlarged scale.
FIG. 8 shows a card of rick-rack trim with adhesive applied in accordance with this invention.

Using the iron-on product of this invention is quick and easy. For example, when a home sewer wishes to trim or furnish a textile article, it is only necessary to position the trim or finding so its adhesive band or bands are properly disposed along what would generally be considered the sew line of the article. Thus, for example, as shown in FIG. 5, a tape or seam binding 20 may be applied to a hem of a skirt, shown generally at 40. In hemming a skirt, employing a seam binding embodying the invention, the bottom of the skirt 40 is first turned up, as shown, to provide a hem 42. The hem may then be pressed in place on the garment by using a flat iron and thereafter the seam binding is positioned over the free edge 44 of the hem with one adhesive band 16 disposed below the edge 44 of the hem and the other in contact with the inner surface of the skirt. Then, using a suitable heat source, such as flat iron 46, the resin may first be heated to a tacky condition for initial positioning of the hem and thereafter sufficiently heated so that the body or mass of the resin is forced by pressure of the iron into the fabric of both the skirt and through fabric 20 of the seam binding, as shown in FIG. 7. It is most essential at this point that the resin not be absorbed or wicked into the fibers of the fabric. The penetration of the resin mass into the seam binding, which is a thin fabric, provides a visual indicator in the form of a line 48, hereinafter called a "lock line," on the face of the seam binding. This shows that the resin has interlocked or encapsulated the skirt fibers sufficiently to form upon hardening of the resin a permanent mechanical bond of the seam binding and skirt fabrics. The "lock line" is a most important feature of this invention, since a positive visual indicator is provided whereby even the most inexperienced user can determine when a permanent bond has been achieved.

In applying iron-on products embodying this invention, the user may first employ light, quick, strokes of the flat iron, to achieve a temporary bond, as a basting. The product such as a seam binding can, if desired, be removed by simply pulling it from the garment. Subsequently the seam binding can be repositioned, and when a satisfactory positioning has been arrived at, the flat iron may be used again with sufficient temperature, time and pressure to achieve a permanent bond indicated by the appearance of the "lock line" 48.

The "lock line" feature is made possible by employing a thin fabric with an adhesive bond having a thickness not substantially less than the fabric thickness. For example, the lock line feature is obtained using a seam binding, the tape comprises a sheer fabric of the order of .005" to .006" in thickness, shown at $a$ in FIG. 4, which is much thinner than the fabric of the skirt to which it is generally applied, together with an adhesive band having a thickness of .003" to .008", shown at $b$ in FIG. 4. When reactivation takes place, the heat source in the form of a flat iron 46 is applied to the surface of the seam binding 20 opposite the skirt fabric 40 as shown in FIG. 5. At the beginning of ironing operations, the portion of the adhesive closest to the heat source will soften more than the remainder of the band, and the binding will be pressed into the softened portion of the adhesive to a greater extent than the adhesive is pressed into the underlying fabric. Because of the relationship of the seam binding fabric and quantity of adhesive concentrated in band form, the adhesive will become visible on the outer surface of the seam. When this happens, we have found that the resin has also penetrated into the underlying fabric sufficiently to produce a permanent bond.

It has been found, using a polyester resin of the type described earlier, that the "lock line" indicator 48, means the tape cannot thereafter be stripped from the fabric and any attempt to do so results in the tape being torn. If, however, the hem requires subsequent adjustment, such as to raise or lower the hem, the tape need only be heated to again soften the resin above its softening point. This will permit the tape to easily be peeled from the skirt and the skirt rehemmed in accordance with the method described above.

In FIG. 8 is shown one other illustrative embodiment of this invention comprising a fabric tape in the form of rick-rack 50 on the back of which is disposed a narrow, flat band of thermoplastic adhesive resin 52. The adhesive-banded rick-rack may be wound on a suitable carrier, such as a card 54. The adhesive band 52 may be applied to the rick-rack in the same manner as disclosed above.

In the case of trims such as rick-rack, bias tape and other decorative tapes and braids, the trims which are of the order of .015" to .027" in thickness, are generally much thicker than the fabric to which they are applied. As with seam binding, a temporary or basting bond can be achieved by light application of the flat iron on the face of the trim. Permanent bond is achieved by reversing the garment, and applying the flat iron to the reverse side of the relatively thinner fabric of the garment until the "lock line" appears.

It will be apparent that extrusions of this heat responsive resin adhesive for bonding together fabric components has wide utility and may be used on any textile trim or finding for garments and other textile articles, and indeed may also be used to fabric complete articles.

In summary, this invention provides "iron-on" trims and findings and their method of manufacture. This invention, through particular fabric constructions combined with a type of adhesive previously untried in "iron-on" products, has achieved improvement over existing "iron-on" products as follows:

(1) Bonding temperatures may range from 260° F. to 475° F. enabling the user to apply these trims to a broad range of fabrics including those of thermoplastic fibers. There is, moreover, no criticality of temperature in this range, that is, if the user varies for any reason from the recommended bonding temperature, the viscosity of the resin will not be lowered so as to be absorbed by the fibers of one fabric.

(2) High bonds of the order of nine to seventeen pounds peel strength are achieved using a one inch wide band of adhesive.

(3) The adhesive employed in this invention is virtually unaffected by continued washing and dry cleaning retaining not only its high bond strength but flexibility and softness as well.

(4) This invention offers the user, for the first time, a visual means of determining when she has applied sufficient temperature and pressure for the necessary time to produce a strong permanent bond.

The method of manufacture includes direct extrusion onto the trim or binding of a heat responsive adhesive resin bonding line. The adhesive bonding line is extruded as to provide a form stable filament along the natural sew line of the trim. The filament thus provides a narrow band of bonding agent which, when heated to bonding temperatures, provides a plastic filament capable of performing the same bonding function as stitching with thread. To apply the trim or finding to the garment, it is only necessary to heat the resin to its bonding range so that the resin is forced, by the pressure of the flat iron, to encapsulate the fibers of the two fabrics along the filament line of the resin. Upon removal of the heat source, the adhesive resin immediately solidifies, mechanically interlocking the trim or finding in place on the garment or other textile article as in sewing.

Having thus disclosed the invention, what is claimed is:

1. Iron-on product comprising a thin, generally sheer textile fabric on the order of 4–6 mils in thickness, at least two narrow, generally parallel bands of hot-melt adhesive disposed on said fabric inwardly of the edges thereof, and having a thickness of 3–8 mils, and not substantially less than the thickness of said fabric and being sufficient to show through the fabric when heat and pressure are applied to the side of said textile fabric opposite said adhesive, said adhesive comprising an isophthalate terephthalate polyester composition having a softening temperature in the range of 200–280° F. but form stable at a temperature of at least 475° F., whereby said adhesive bands are visible through said fabric because of the relationship of the thickness of said fabric and said adhesive bands.

References Cited
UNITED STATES PATENTS

| | | | |
|---|---|---|---|
| 3,013,914 | 12/1961 | Willard. | |
| 3,116,967 | 1/1964 | Goldstein et al. | 8—116.3 X |
| 3,168,749 | 2/1965 | Cala | 2—243 |
| 3,212,115 | 10/1965 | Crowell | 156—332 X |

ROBERT F. BURNETT, Primary Examiner

R. O. LINKER, JR., Assistant Examiner

U.S. Cl. X.R.

2—243; 156—167, 178, 295, 436; 161—88, 147, 167